US007607051B2

(12) United States Patent
Koike (10) Patent No.: US 7,607,051 B2
(45) Date of Patent: Oct. 20, 2009

(54) DEVICE AND METHOD FOR PROGRAM CORRECTION BY KERNEL-LEVEL HARDWARE MONITORING AND CORRELATING HARDWARE TROUBLE TO A USER PROGRAM CORRECTION

(75) Inventor: Tomotake Koike, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 539 days.

(21) Appl. No.: 11/386,705

(22) Filed: Mar. 23, 2006

(65) Prior Publication Data

US 2006/0248531 A1  Nov. 2, 2006

(30) Foreign Application Priority Data

Mar. 31, 2005  (JP) .............................. 2005-102418

(51) Int. Cl.
  G06F 11/00 (2006.01)
  G06F 11/07 (2006.01)
(52) U.S. Cl. .............................. 714/55; 714/38; 714/56
(58) Field of Classification Search ................... 714/38, 714/55, 56
  See application file for complete search history.

(56) References Cited

U.S. PATENT DOCUMENTS

| 5,528,753 | A  | * | 6/1996  | Fortin .......................... 714/35 |
| 5,630,049 | A  | * | 5/1997  | Cardoza et al. ............... 714/25 |
| 6,931,571 | B2 | * | 8/2005  | Bernadat et al. .............. 714/25 |
| 6,959,262 | B2 | * | 10/2005 | Curry, III ..................... 702/183 |
| 7,000,154 | B1 | * | 2/2006  | LeDuc et al. .................. 714/47 |
| 7,373,558 | B2 | * | 5/2008  | Mukherjee ..................... 714/48 |
| 2003/0140271 | A1 | * | 7/2003 | Wynn et al. ..................... 714/8 |
| 2005/0015672 | A1 | * | 1/2005 | Yamada ......................... 714/38 |
| 2005/0120273 | A1 | * | 6/2005 | Hudson et al. ................. 714/38 |
| 2006/0085670 | A1 | * | 4/2006 | Carver et al. ................... 714/5 |

FOREIGN PATENT DOCUMENTS

JP  2001-345850  12/2001

OTHER PUBLICATIONS

Diagnostic Kernel Extension IBM Technical Disclosure Bulletin, Oct. 1992, US TDB-ACC-No. NN9210137.*
Hardware-Related Software Errors: Measurement and Analysis by Iyer and Velardi Published Feb. 1985 IEEE Transactions on Software Engineering ISSN: 0098-5589.*

* cited by examiner

*Primary Examiner*—Scott T Baderman
*Assistant Examiner*—Joseph Schell
(74) *Attorney, Agent, or Firm*—Venable LLP; James R. Burdett (57) ABSTRACT

An information processing device comprising a group of hardware of various types in the first layer, kernel modules and a hang checking part in the second layer, and a group of user programs and a monitoring program for monitoring and grasping the operating states of the user programs in the third layer. The kernel modules are used to access hardware corresponding thereto in response to a request from the user program. The hang checking parts performs hang checking by inspecting whether the hardware access performed by the kernel module is in a normal state or not, and outputting a hardware trouble detection notification in cases where an abnormality in hardware access is detected. The monitoring program checks the operating states of the user programs corresponding to the notification, and executes a specified operation against hardware trouble when these operating states become such that the execution of the operation is permissible. As a result, the availability of an information processing device is increased.

5 Claims, 6 Drawing Sheets

DEVICE AND METHOD FOR PROGRAM CORRECTION BY KERNEL-LEVEL HARDWARE MONITORING AND CORRELATING HARDWARE TROUBLE TO A USER PROGRAM CORRECTION

BACKGROUND OF THE INVENTION

1. Field of the Invention

The present invention relates to an information processing device, an information processing method and a computer-readable medium having an information processing program, which are suitable for use in, for example, a call control server or the like.

2. Description of Related Art

Conventionally, in most OS (operating systems), in cases where kernel stopping occurs due to hardware trouble, the system goes down, or an operation is performed which dumps information indicating the state of the system at the time that the kernel stops.

In systems in which a high degree of availability is required a construction may be adopted in which a plurality of server devices (e.g., call control server devices A and B) are caused to cooperate by performing clustering or the like. In such a construction, a cluster management program is provided inside each call control server device as one user program that operates at a higher layer of the OS, and that utilizes services provided by the OS. For example, the cluster management program executes processing that transfers call state information indicating the call conditions accumulated inside the call control server device A to the other cooperating call control server device B, and the like. In cases where the call control server device A stop operation, the call control server device B can provide a call control service in place of the call control server device A by receiving the transferred call state information.

However, in cases where the OS (e.g., the OS of the call control server device A) performs only processing such as the abovementioned dumping or the like and then shuts down the system because of hardware trouble, the transfer of the call state information is suddenly interrupted. In this case, there is a great possibility that the call control service provided by the call control server device B in place of the call control server device A will be obstructed. Accordingly, this system is recognized as having a low availability from the standpoint of call control service users utilizing IP telephones or the like.

SUMMARY OF THE INVENTION

In order to solve such problems, according to a first aspect of the present invention, there is provided an information processing device which realizes desired functions using a hierarchical structure in which a group of hardware of various types is disposed in the first layer which is the lowest hierarchical layer, a broad-definition kernel is disposed in the second layer which is a hierarchical layer above the first layer, and a group of user programs of various types is disposed in the third layer which is the hierarchical layer above the second layer.

The broad-definition kernel is constructed from a basic kernel which constitutes the core portion of this broad-definition kernel, and an expanded kernel which constitutes an expanded portion. The expanded kernel includes a first expanded kernel for hardware access, and a second expanded kernel for hang checking is provided. The group of user programs includes a first user program corresponding to the expanded kernel and a second user program for monitoring and grasping the operating states of other user programs except the second user program. The hardware corresponding to the first expanded kernel is accessed in response to a request from the first user programs. The second expanded kernel is caused to perform hang checking by inspecting whether the hardware access performed by the first expanded kernel is in a normal state or in an abnormal state, and outputting a hardware trouble detection notification in a case where an abnormality in hardware access is detected.

The second user program performs checking the operating states of other user programs corresponding to this hardware trouble detection notification in response to the hardware trouble detection notification, and executes the specified operation against hardware trouble when these operating states become such that the execution of a specified operation against hardware trouble is permissible.

Furthermore, according to a second aspect of the present invention, there is provided an information processing method which realizes desired functions using a hierarchical structure in which a group of hardware of various types is disposed in the first layer which is the lowest hierarchical layer, a broad-definition kernel is disposed in the second layer which is the hierarchical layer above the first layer, and a group of user programs of various types is disposed in the third layer which is the hierarchical layer above the second layer. The method comprises the following steps.

The broad-definition kernel is constructed from a basic kernel which constitutes the core portion of this broad-definition kernel, and an expanded kernel which constitutes an expanded portion. The expanded kernel as its parts with a first expanded kernel for hardware access, and a second expanded kernel for hang checking is provided. The group of user programs as its parts with a first user program corresponding to the expanded kernel and a second user program for monitoring and grasping the operating states of other user programs except the second user program. The hardware corresponding to the first expanded kernel is accessed in response to a request from the first user programs. The second expanded kernel is caused to perform hang checking by inspecting whether the hardware access performed by the first expanded kernel is in a normal state or in an abnormal state, and outputting a hardware trouble detection notification in a case where an abnormality in hardware access is detected.

The second user program is caused to perform checking the operating states of other user programs corresponding to this hardware trouble detection notification in response to the hardware trouble detection notification, and to execute the specified operation against hardware trouble when these operating states become such that the execution of a specified operation against hardware trouble is permissible.

Furthermore, according to a third aspect of the present invention, there is provided a computer-readable medium having software for performing the abovementioned information processing method.

As a result of the present invention, the availability of information processing devices used in call control devices or the like is increased to an extremely high level.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS (A) Embodiment

The information processing device, information processing method and a computer-readable medium having an information processing program of the present invention will be described below with reference to the attached figures, using as an example a case in which this device, method and program are used in the call control server device of a VoIP communications system.

(A-1) Construction of Embodiment

Figure 6:
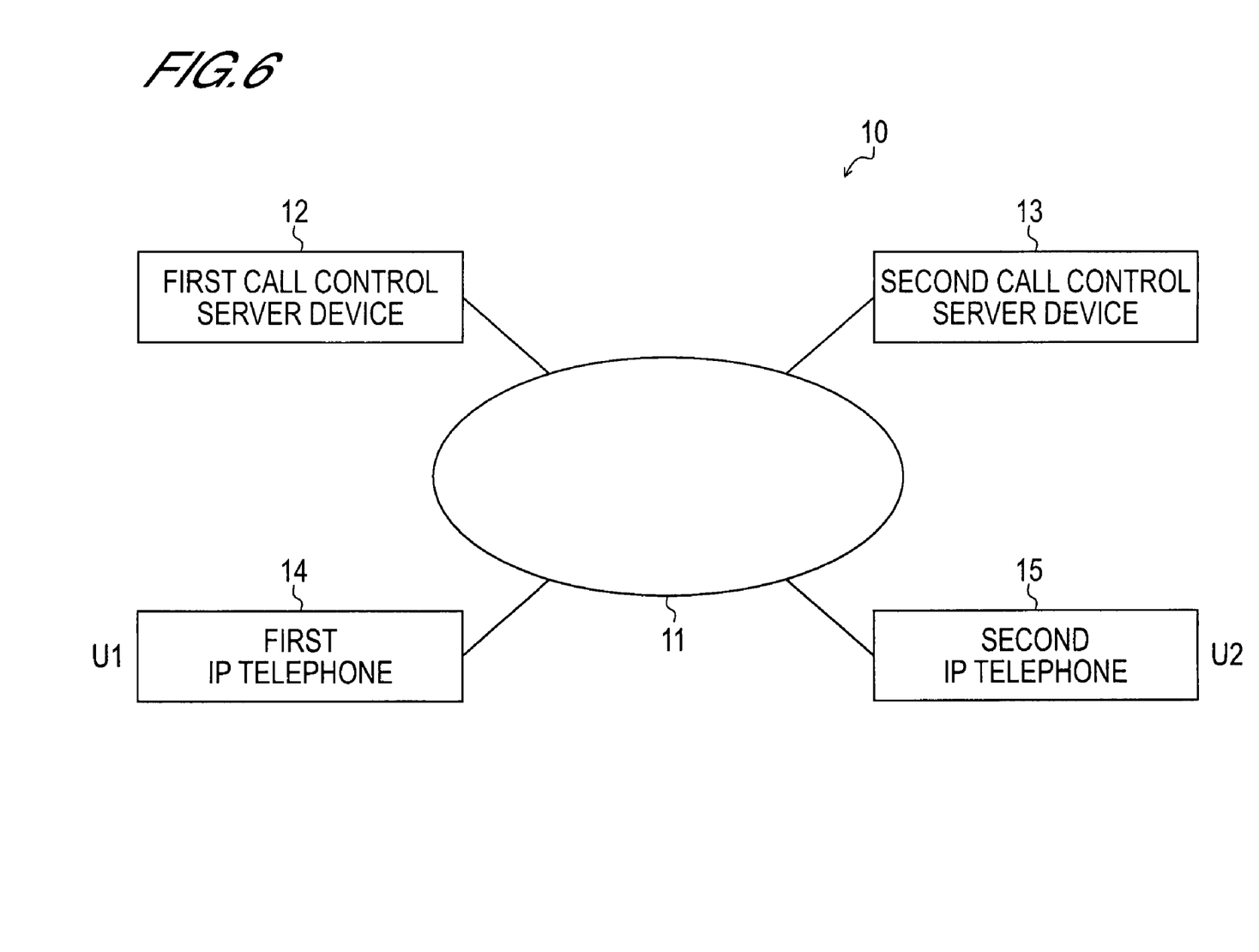
FIG. 6 is a schematic diagram showing an example of the overall construction of the VoIP communications system in the embodiment of the invention.

In FIG. 6, the VoIP communications system 10 comprises the internet 11, first and second call control server devices 12 and 13, and first and second IP telephones 14 and 15. Furthermore, servers not shown in the figures (e.g., DNS servers or the like) may also naturally be present in this VoIP communications system 10.

Among these parts, the internet 11 may be replaced by some other network.

The first call control server device 12 is a server that provides various types of services such as a call control service and the like to IP telephones via the internet 11. For example, the first call control server device 12 corresponds to an SIP server or the like. Furthermore, the first call control server device 12 may also have the function of a location server or the like.

The second control server device 13 is a communications device which also has the same functions as the first call control server device 12. A clustering construction is formed by the first call control server device 12 and second call control server device 13. Accordingly, for example, in cases where hardware trouble occurs in the first call control server device 12 while the first call control server device 12 is providing a call control service to the first and second IP telephones 14 and 15, the second call control server device 13 takes over the service that was being provided by the first call control server device 12 as is. In a system in which a clustering construction is adopted by the first call control server device 12 and second call control server device 13, a high degree of availability is required which is such that the users U1 and U2 of the first and second IP telephones 14 and 15 are absolutely unaware of the occurrence of hardware trouble or the occurrence of a takeover of the service before and after this takeover of the service.

The first IP telephone 14 is a telephone which has a VoIP correspondence function. The first IP telephone 14 can be replaced by a system that combines a VoIP gateway and a general telephone. Furthermore, the term "general telephone" refers to a telephone that does not have a VoIP function.

The second IP telephone 15 has the same function as the first IP telephone 14. The first IP telephone 14 is utilized by the user U1, and the second IP telephone 15 is utilized by the user U2.

Figure 1:
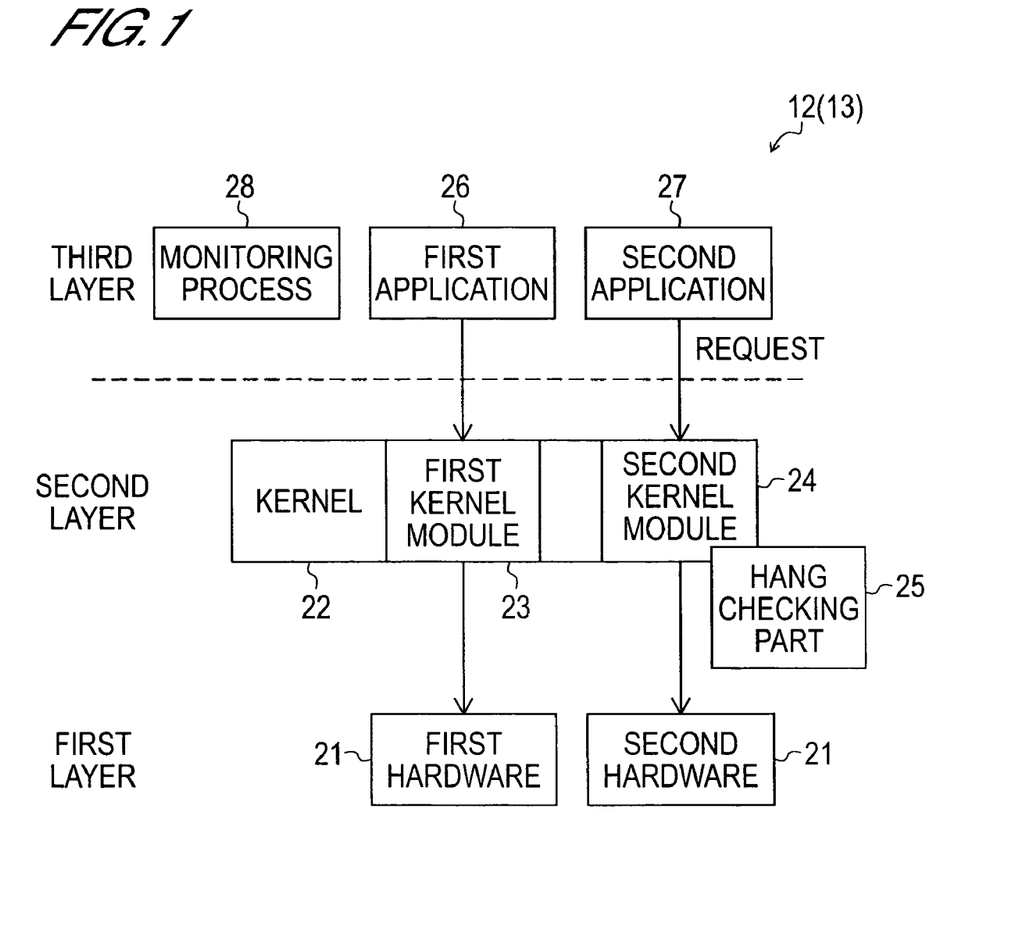
FIG. 1 is a schematic diagram showing an example of the construction of the main parts of the call control server device used in the embodiment according to the invention.

FIG. 1 is a diagram showing an example of the internal construction of the first call control server device 12. The internal construction of the second call control server device 13 is the same as that of the first call control server device 12.

(A-1-1) Example of Internal Construction of Call Control Server Device

In FIG. 1, the first call control server device 12 comprises first hardware and second hardware 20 and 21 in a first layer, which is the lowest hierarchical layer. This call control server device 12 further comprises a kernel 22, first and second kernel modules 23 and 24, and a hang checking part 25 in a second layer, which is the hierarchical layer above the first layer, and comprises a group of user programs in a third layer, which is the hierarchical layer above the second layer. The group of user programs includes first and second applications 26 and 27 and a monitoring process 28. Furthermore, the program that is used to realize the monitoring process 28 is called a monitoring program.

Among these parts, the first hardware 20 may be any arbitrary hardware, but is limited to hardware that is the object of monitoring for hardware trouble. As is universally known, communications devices comprise various types of hardware; however, hardware that is the object of monitoring for hardware trouble is limited to hardware that is important for services that are provided by the communications device. For example, in the first call control server device 12 that provides a call control service, it may be said that the NIC (network interface card), hard disk and the like are important hardware. The NIC is hardware that is indispensable for performing communications via a network. Furthermore, the hard disk is hardware that is indispensable for accumulating log information and the like. For communications enterprises which provide IP telephone services, call processing log information is extremely important in connection with billing and the like.

The second hardware 21 is hardware that is similar to the first hardware 20. For example, the first hardware 20 is a hard disk, and the second hardware 21 is an NIC. Furthermore, since each call control server device is ordinarily equipped with a plurality of NICs, e.g., six NICs, extremely detailed management can be accomplished by determining for each NIC, i.e., for each network, whether or not this network is to be an object of monitoring.

The kernel 22 is a program that constitutes the core part of the OS; this kernel 22 performs memory management, task management and the like.

The kernel modules are programs corresponding to device drivers or the like. Accordingly, a kernel module may exist for each device (each piece of hardware). In cases where the term "kernel" is taken in a broad sense, the kernel modules may also be classified in the kernel. Here, the kernel 22 is taken as a kernel in the narrow sense, and this kernel 22 may also be called a basic kernel.

The first kernel module 23 is a device driver for the first hardware 20, and the second kernel module 24 is a device driver for the second hardware 21. Accordingly, the first and second kernel modules 23 and 24 execute tasks for hardware access with respect to the first and second hardware, respectively. These tasks are hereafter referred to as hardware access tasks.

Kernel modules that have a hang checking part and kernel modules that do not have a hang checking part are mixed together among the plurality of kernel modules that are mounted inside the first call control server device 12. In the example shown in the figures, the second kernel module 24 has a hang checking part 25, but the first kernel module 23 does not have a hang checking part. In the case of the second kernel module 24, which has this hang checking part 25, hang checking tasks corresponding to processing in the hang checking part 25 are performed in addition to hardware access tasks during the execution of operations by this second kernel module 24.

The hang checking part 25 is a program that constitutes a portion of the second kernel module 24; this plays a special role in the present embodiment. Specifically, the hang checking part 25 has the function of detecting the hanging up of the second kernel module 24 itself. The concrete function with which the hang checking part 25 is provided in order to detect the hanging up of the second kernel module 24 itself will be described later. The hang checking part 25 checks by inspecting whether the hardware access performed by the second kernel module 24 is in a normal state or in an abnormal state. In cases where the hang checking part 25 detects the hanging up of the second kernel module 24, the hang checking part 25 outputs a hardware trouble notification HE1 (see FIG. 2) to the abovementioned monitoring process 28. Naturally, in cases where a plurality of kernel modules that have hang checking parts are present, discriminating information indicating the kernel module to which the hardware trouble notification HE1 pertains may also be outputted along with this hardware trouble notification HE1. The portion of the second kernel module 24 which executes tasks for hardware access may also be called the first expanded kernel. The hang checking part 25 may also be called the second expanded kernel.

The first application 26 is a first user program that utilizes the service provided by the kernel 22 and first kernel module 23. Similarly, the second application 27 is a first user program that utilizes the service provided by the kernel 22 and second kernel module 24. Applications that operate on the call control server device 12 may include various types of applications; however, the main applications are service applications that are used to provide call control services and the like. Here, as one example, it is assumed that the second application 27 is a service application that provides a call control service. The program that is used to realize the monitoring process 28 is classified in a second user program.

The respective applications are determined by the kernel modules utilized in accordance with the function involved.

For example, in the case of a service application that provides a call control service, it is essential that communications be performed via a network. Consequently, the second kernel module 24 which is the device driver of the second hardware (NIC) 21 is utilized. Accordingly, for example, in cases where the second kernel module 24 is caused to hang up because of hardware trouble, the second application 27 can no longer provide the call control service. For example, such hardware trouble includes trouble in the NIC itself or the like.

The monitoring process 28 is an application that monitors and grasps the operating states of the respective applications that are objects of monitoring. In case where the monitoring process 28 receives a hardware trouble notification HE1, the monitoring process 28 first checks that the corresponding application is in a state that permits the execution of a specified operation against hardware trouble (trouble recovery operation), and then causes this trouble recovery operation to be executed.

The applications that are objects of monitoring are applications utilizing kernel modules that have a hang checking part 25 (here, the second kernel module 24). Accordingly, assuming that there are no kernel modules other than the first and second kernel modules 23 and 24, if the first application 26 utilizes the first kernel module 23, but does not utilize the second kernel module 24, then the first application 26 is not an object of monitoring. On the other hand, since the second application 27 utilizes the second kernel module 24, this second application 27 is an object of monitoring.

The trouble recovery operation may include various types of operations, e.g., restarting or rebooting of the OS and the like. Furthermore, the application state in which execution of this trouble recovery operation is permissible corresponds to, for example, a state in which transfer has been completed in cases where the service application is transferring the abovementioned call status information to another call control server device, for example, the second call control server device 13. If the transfer of such call status information is completed normally without being hindered by rebooting, the transfer of the service between the first and second call control server devices 12 and 13 can be performed smoothly; accordingly, the availability of the call control service can be increased.

The operation of the present embodiment is realized by executing software recorded on a computer-readable medium.

The operation of the present embodiment will be described below with reference to FIGS. 2 through 5.

Figure 2:
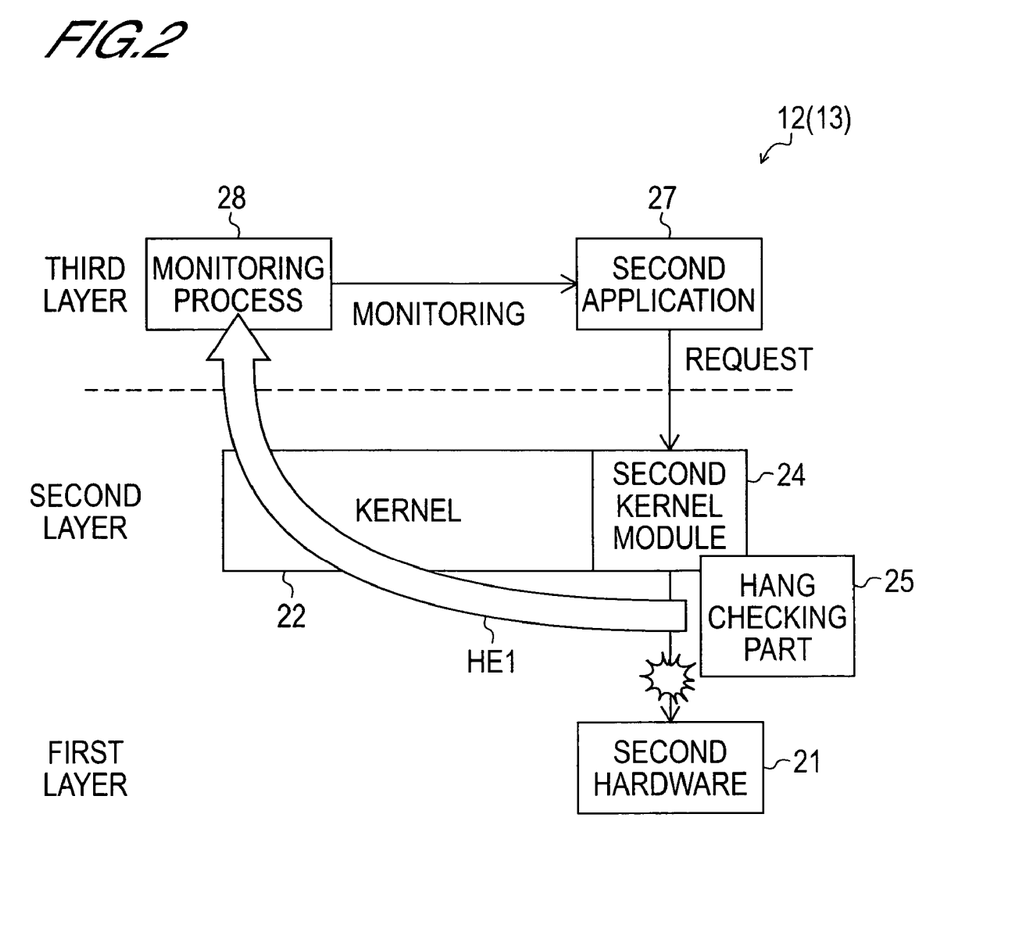
FIG. 2 is a schematic diagram showing an example of the operation of the call control server device used in the embodiment according to the invention.

FIG. 2 is a schematic diagram for explaining how the hardware trouble notification is accomplished.

Figure 3:
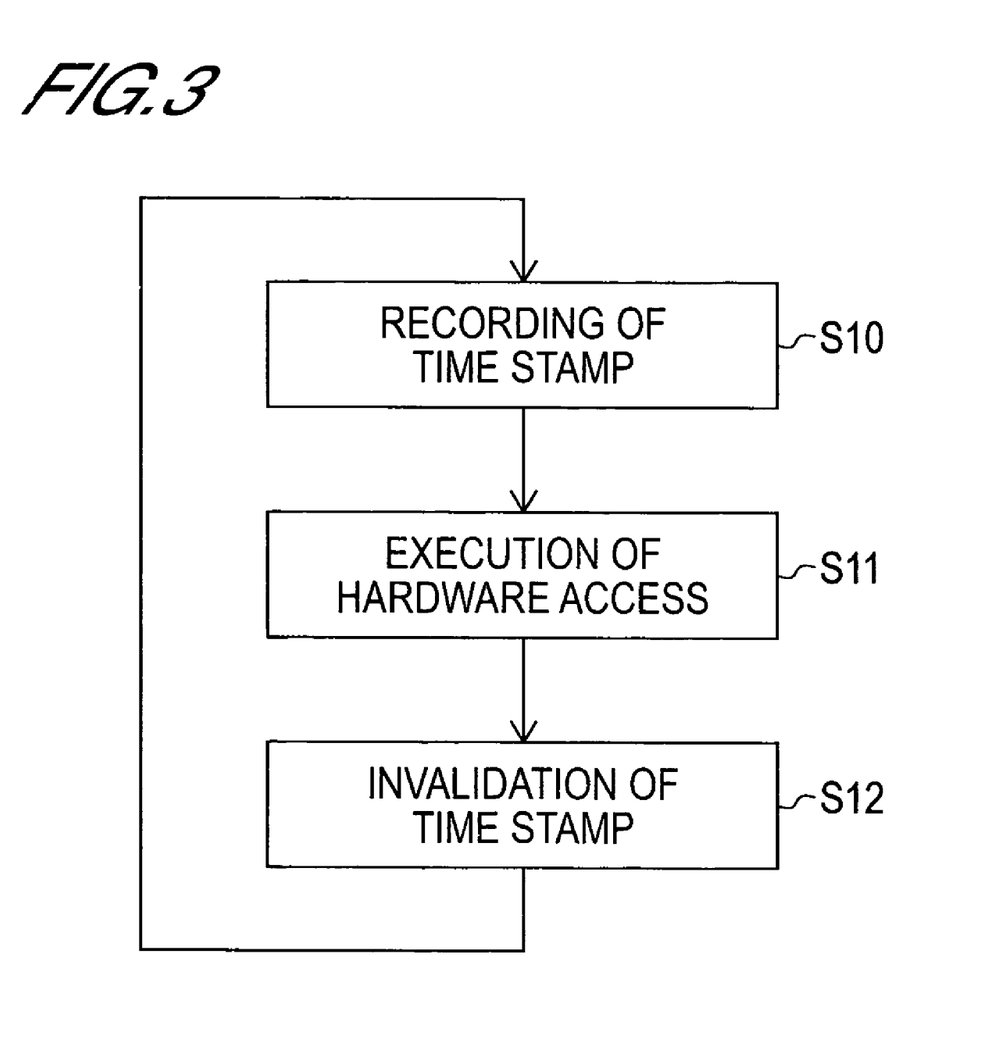
FIG. 3 is a flow chart showing an example of the operation of the call control server device used in the embodiment according to the invention.

FIG. 3 is flow chart for explaining the operation that is executed by the hardware access task for the purpose of hang checking. This operation has the respective steps of S10 through S12.

Figure 4:
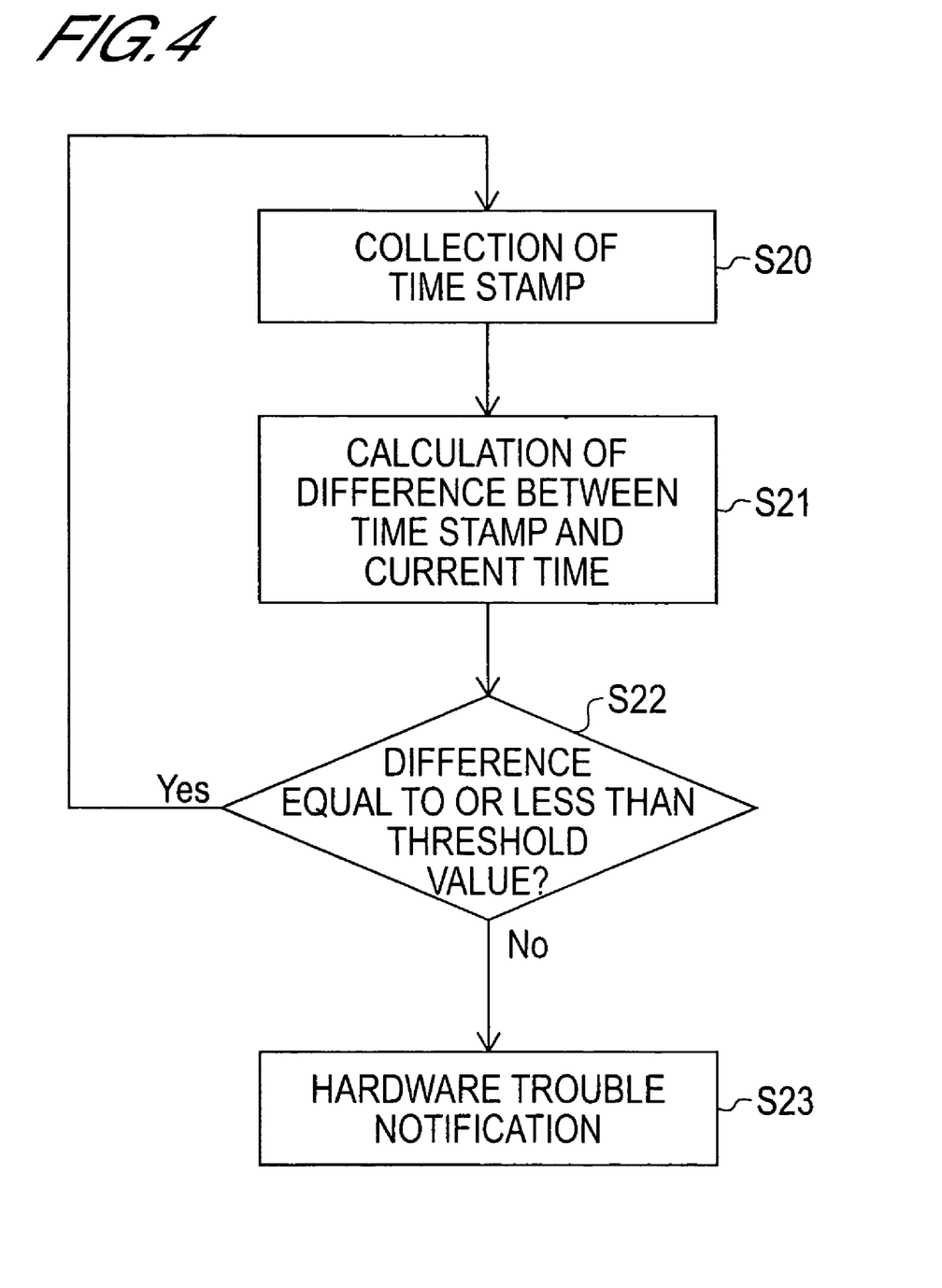
FIG. 4 is a flow chart showing an example of the operation of the call control server device used in the embodiment of the invention.

FIG. 4 is a flow chart for explaining the operation that is executed by the hang checking task for the purpose of hang checking. This operation has the respective steps of S20 through S23.

Figure 5:
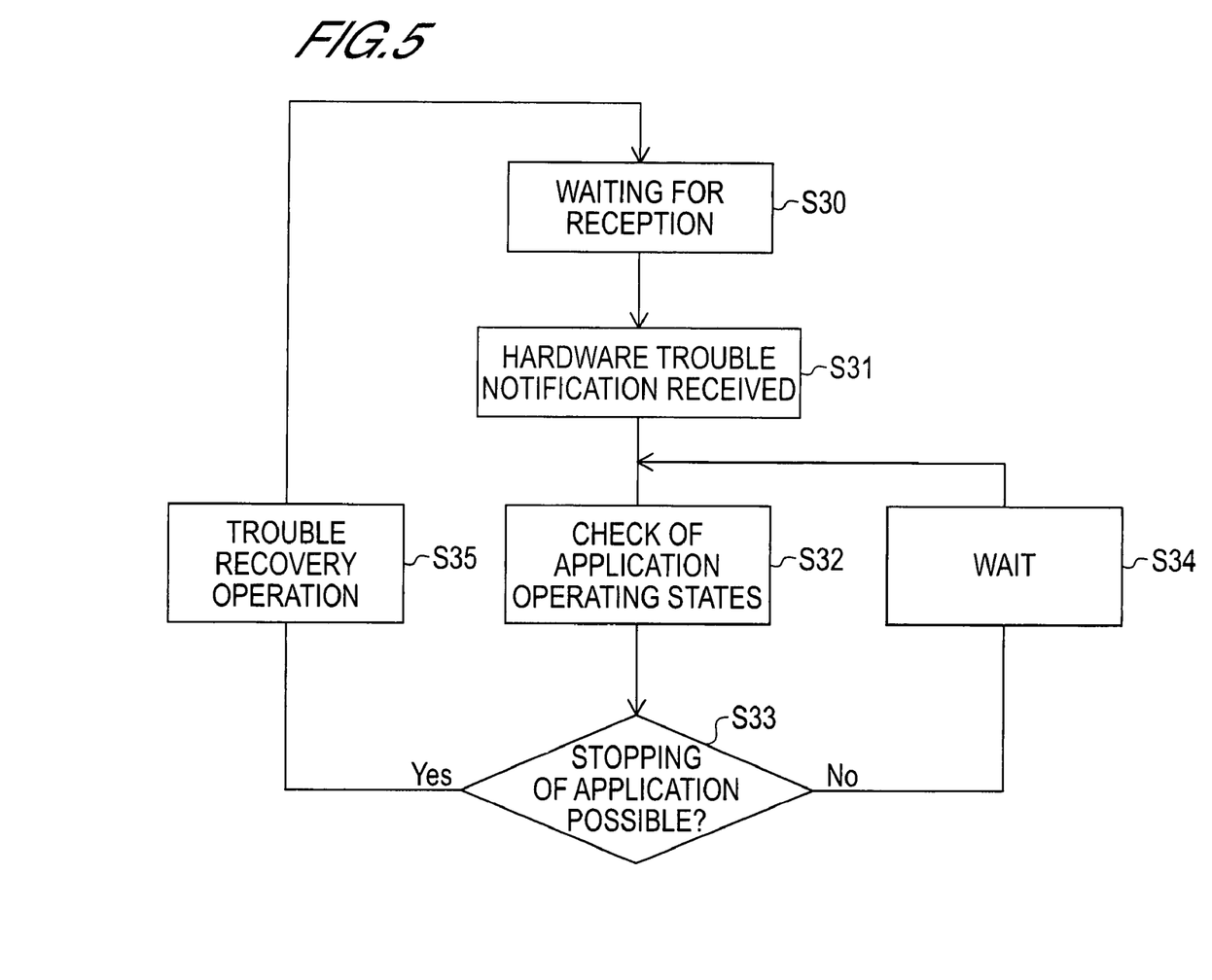
FIG. 5 is a flow chart showing an example of the operation of the call control server device used in the embodiment of the invention.

FIG. 5 is a flow chart for explaining the operation of the monitoring process 28. This operation has the respective steps of S30 through S35. Here, the operation will be described with a principal focus on the first call control server device 12. Naturally, a similar operation may also be executed in the second call control server device 13 as well.

(A-2) Operation of Embodiment

When the first call control server device 12 is operating, the second application 27 provides a call control service to the respective IP telephones (e.g., first and second IP telephones 14 and 15) via the internet 11 utilizing the second hardware (NIC) 21 via the second kernel module 24. Furthermore, when call status information is generated as this call control service progresses, this call status information is transferred to the second call control server device 13 by a specified procedure. A construction in which the transfer of call state information is executed by other applications may also be used; the second application 27 itself executes the transfer of call state information.

In this case, it is advisable that the monitoring process 28 be loaded into the memory, i.e., the main memory device, of the first call control server device 12 at all times, so that this first call control server device 12 is always in a state that permits the reception of a hardware trouble notification HE1.

In cases where the second kernel module 24 executes a hardware access task, e.g., transmission or reception of a call control message or the like, the second kernel module 24 always performs this by repeating an operation in which a time stamp is first recorded as time record information (step 10, step is hereafter abbreviated to "S"), the hardware access task is then executed (S11), and the time stamp recorded in S10 is then invalidated (S12) once the hardware access task has been normally completed as shown in FIG. 3. The time stamp recorded in S10 may also be a time stamp indicating the time at this point in time. The invalidation of the time stamp in S12 is an operation that is performed in order to inform the hang checking part 25 that the current hardware access has been successful. This invalidation of the time stamp changes the time stamp into an access-success-state. Accordingly, this may be executed in any configuration, as long as this object can be achieved.

In the second kernel module 24, a hang checking task operates substantially simultaneously and in parallel with this hardware access task, and as is shown in FIG. 4, the time stamp is collected (S20). This hang checking task collects the time stamp recorded by the hardware access task in S10. At this point in time, if the abovementioned time stamp has been invalidated in S12, collection itself is not performed. On the other hand, if the time stamp has not been invalidated, the time stamp is collected, and the next step S21 is executed.

In S21, the difference between the time indicated by the time stamp and the current time is calculated. Then, if the calculated difference is equal to or less than a specified threshold value, the processing branches to the Yes side in S22, and returns to S20. On the other hand, if the calculated difference exceeds this specified threshold value, the processing branches to the No side in S22. In S23 which is executed following branching to the No side in S22, the hardware trouble notification HE1 shown in FIG. 2 is outputted. As a result, silent trouble which is such that the fact of this trouble cannot be detected by the monitoring process 28 in spite of the fact that such hardware trouble has occurred can be prevented.

On the other hand, in the case of the example shown in FIG. 5, the monitoring process 28 is in a reception waiting state in which this process can receive the abovementioned hardware trouble notification HE1 at any time (S30). Then, when the monitoring process 28 actually receives such a hardware trouble notification HE1 (S31), the monitoring process 28 checks the operating state of the service application corresponding to the second kernel module 24 which is the transmission source of the abovementioned hardware trouble notification HE1 (S32). This check process may be executed at all times; however, in the example shown in FIG. 5, this processing is executed after a hardware trouble notification HE1 is received.

In any case, if the state of the second application 27 at the point in time at which the hardware trouble notification HE1 is received is "transfer of call status information in progress" or the like, the monitoring process 28 judges that the second application 27 is in a state that does not permit this application to be stopped, and the processing branches to the No side in S33. Then, after a specified waiting time (S34), the processing again proceeds to S32. The loop formed by these S32, S33 and S34 is repeated until the second application 27 assumes a state that permits the application to be stopped.

For example, when the transfer of the call status information is completed, the monitoring process 28 judges that the second application 27 has assumed a state that permits the stopping of the application, and the processing branches to the Yes side in S33. Subsequently, a trouble recovery operation (S35), e.g., rebooting of the OS or the like, is executed.

If the OS is rebooted, the monitoring process 28 itself also stops temporarily. Following rebooting, the monitoring process 28 again initiates processing from S30.

(A-3) Effect of the Embodiment

Thus, in the present embodiment, cooperation between the first and second call control server devices 12 and 13 can be appropriately accomplished in a clustering construction in which the first and second call control server devices 12 and 13 form. Consequently, the availability of the call control server devices can be increased to an extremely high level.

In addition, in the present embodiment, extremely fine management can be accomplished by determining whether or not hang checking is performed on the basis of the individual kernel modules. Accordingly, compared to a case where hang checking is performed for all of the kernel modules, the increase in the load due to hang checking, e.g., the increase in the use rate of the CPU (central processing unit) or the like, can be alleviated.

(B) Other Embodiments

In the abovementioned embodiment, there were two call control server devices for which a clustering construction was adopted. However, it would also naturally be possible to install three or more call control server devices.

Furthermore, only two IP telephones, i.e., first and second IP telephones 14 and 15, were shown in FIG. 6. However, it would also naturally be possible for one VoIP communications system to contain three or more IP telephones.

Furthermore, in the abovementioned embodiment, a construction was used in which a second kernel module 24 installed as a separate kernel module had a hang checking part 25 used to detect the hanging up of this kernel module 24 itself. On the other hand, it would also be possible to devise the system so that an independent kernel module that detects the hanging up of other kernel modules, e.g., a kernel module used for hang checking, is provided, and the hanging up of other kernel modules is detected using this kernel module used for hang checking.

If necessary, furthermore, a narrow-definition kernel 22 may be endowed with a function that detects the hanging up of kernel modules.

Furthermore, in the abovementioned embodiment, the present invention was applied to a VoIP communications system. However, the present invention may also be applied to systems other than a VoIP communications system.

Furthermore, the communications protocol shown for example in the abovementioned embodiment may be replaced by some other communications protocol. For instance, as one example, the internet protocol may possibly be replaced by an IPX protocol or the like, and the SIP protocol may also possibly be replaced by some other call control protocol.

Furthermore, in the abovementioned embodiment, the present invention was applied to a call control server device; however, the present invention may also be applied to communications devices other than call control server devices.

Furthermore, the present invention may also be applied to information processing devices other than communications devices.

According to the above description, most of the functions realized by means of hardware can be realized by means of software. Furthermore, almost all of the functions realized by means of software could also be realized by means of hardware.

What is claimed is:

1. An information processing device which realizes desired functions using a hierarchical structure, the device comprising:
   a group of hardware of various types disposed in a first layer which is the lowest layer of the hierarchical structure;
   a kernel, a kernel module and a hang checking part disposed in a second layer which is the hierarchical layer above said first layer; and
   a group of user programs of various types and a monitoring program for monitoring and grasping operating states of the user programs disposed in a third layer which is the hierarchical layer above said second layer;
   wherein the kernel module is used to access hardware corresponding thereto in response to a request from said user program;
   wherein the hang checking part performs hang checking by inspecting whether the hardware access performed by said kernel module corresponding thereto is in a normal state or in an abnormal state, and outputting a hardware trouble detection notification in a case where an abnormality in the hardware access is detected; and
   wherein said monitoring program performs checking the operating states of the user programs corresponding to said hardware trouble detection notification in response to said hardware trouble detection notification, and executes a specified operation against hardware trouble when said operating states become such that the execution of said specified operation against hardware trouble is permissible.

2. The information processing device according to claim 1, wherein
   said kernel module performs prior to accessing said hardware corresponding thereto, recording of time record information indicating the time at this point in time, and then making change of said time record information to a specified access-success-state after said kernel module has accessed said hardware corresponding thereto; and
   wherein said kernel module performs judging whether or not the time period corresponding to the difference between the current time and the time indicated by time record information that is not in said access-success-state exceeds a specified reference time period, and outputting said hardware trouble detection notification in a case where it is judged that said time period exceeds said reference time period.

3. A trouble recovery method which realizes desired functions using an information processing device comprising: a group of hardware of various types disposed in a first layer which is the lowest layer of the hierarchy,
   a kernel, a kernel module, and a hang checking part disposed in a second layer which is the hierarchical layer above said first layer, and
   a group of user programs of various types and a monitoring program for monitoring and grasping the operating states of the user programs disposed in a third layer which is the hierarchical layer above said second layer, the method comprising the steps of:
   causing said kernel module to access hardware corresponding thereto in response to a request from said user program;
   causing said hang checking part to perform hang checking by inspecting whether the hardware access performed by said kernel module is in a normal state or in an abnormal state, and outputting a hardware trouble detection notification in a case where an abnormality in the hardware access is detected; and
   causing said monitoring program to perform checking the operating states of the user programs corresponding to said hardware trouble detection notification in response to said hardware trouble detection notification, and to execute a specified operation against hardware trouble when said operating states become such that the execution of said specified operation against hardware trouble is permissible.

4. A computer-readable medium having software for performing the method of claim 3.

5. The trouble recovery method according to claim 3,
   wherein said kernel module performs prior to accessing said hardware corresponding thereto, recording of time record information indicating the time at this point in time, and then changing said time record information to a specified access-success-state after said kernel module has accessed said hardware corresponding thereto; and
   wherein said kernel module performs judging whether or not the time period corresponding to the difference between the current time and the time indicated by time record information that is not in said access-success-state exceeds a specified reference time period, and outputting said hardware trouble detection notification in a case where it is judged that said time period exceeds said reference time period.

* * * * *

UNITED STATES PATENT AND TRADEMARK OFFICE
CERTIFICATE OF CORRECTION

PATENT NO.       : 7,607,051 B2
APPLICATION NO. : 11/386705
DATED            : October 20, 2009
INVENTOR(S)      : Tomotake Koike It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this

Twelfth Day of October, 2010

David J. Kappos
*Director of the United States Patent and Trademark Office*